Sept. 5, 1967
W. R. KEITH
3,339,761
AUGER ELEVATOR DISCHARGE CHUTE GUIDE
Filed June 14, 1966
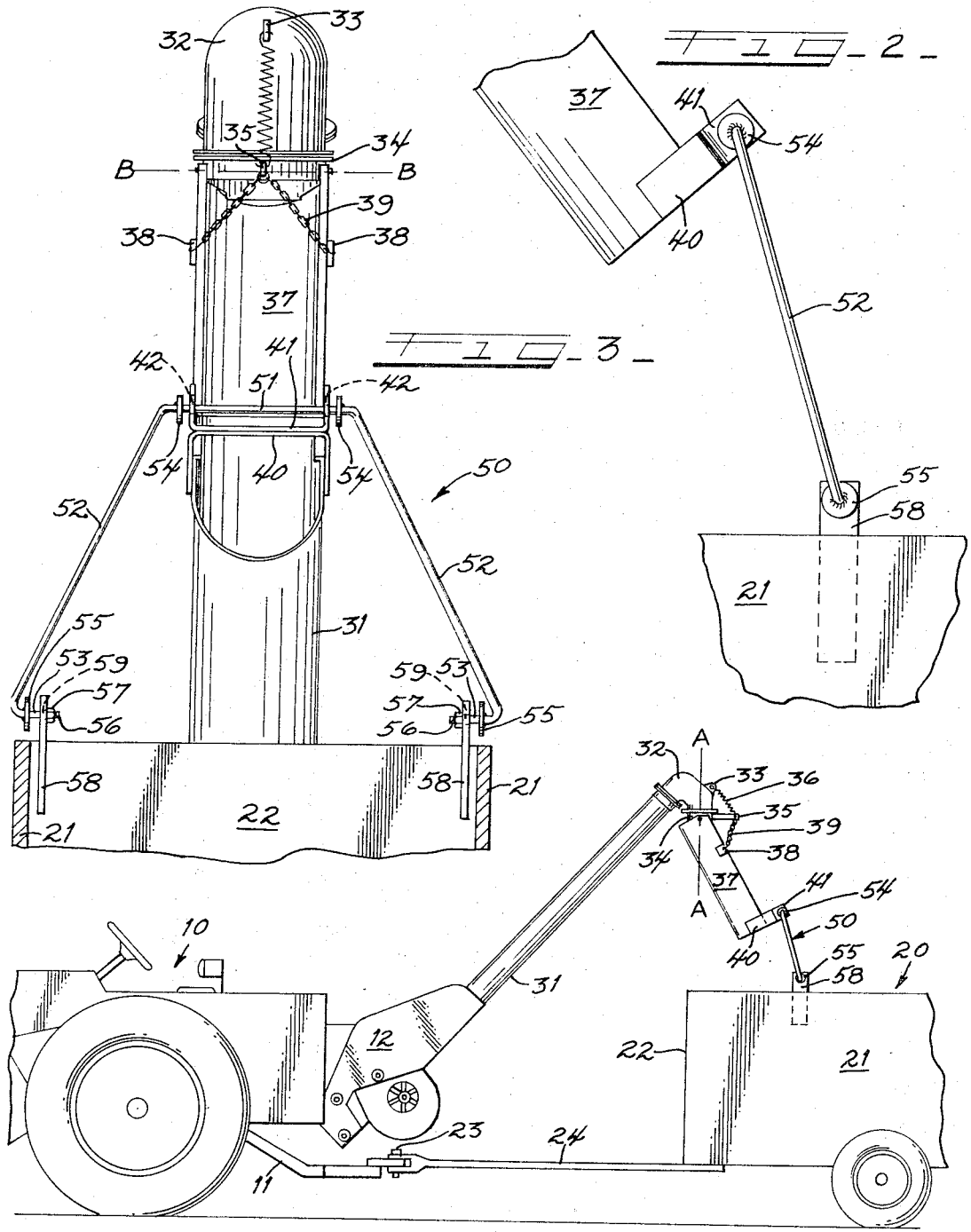
INVENTOR
WINSTON R. KEITH
BY
ATT'Y.

United States Patent Office 3,339,761
Patented Sept. 5, 1967

3,339,761
AUGER ELEVATOR DISCHARGE
CHUTE GUIDE
Winston Roland Keith, Bettendorf, Iowa, assignor to International Harvester Company, Chicago, Ill., a corporation of Delaware
Filed June 14, 1966, Ser. No. 557,459
10 Claims. (Cl. 214—42)

The present invention relates generally to a guide for an auger elevator discharge chute and more particularly to a new and improved guide that is not fixed to the sides of the trailing wagon.

In harvesting some grains such as corn it is a common practice to hitch a trailing wagon to the farm implement arranged to receive the corn from an elevator that extends rearwardly from the implement. The elevator is provided with a downwardly directed swiveling chute to insure that the grain is deposited in the center of the wagon. In the past, means such as springs have been connected to the sides of the wagon and to the chute to retain the discharge end of the chute in the center of the wagon regardless of the relative position of the implement and the wagon. These spring means are necessary to keep the chute properly aimed when turning for contour planted crops and at the ends of the rows. A disclosure of a spring means such as this can be found in the patent to Court, No. 2,377,760, of June 5, 1945.

Although a chute guided by springs in the manner discussed above functions satisfactorily there are several undesirable features to this device that the subject invention has overcome. The trailing wagons often have extremely high side walls and it is a difficult and time-consuming task for the operator to connect the springs to the side walls. Furthermore, the spring devices have caused accidents when for example the operator is careless in forgetting to disconnect the ends of the springs from the side walls and drives the tractor away from the wagon. There have been occasions when the operator desiring to detach the wagon from the tractor will remove the hitch pin that connects the tractor drawbar to the wagon tongue but forgets to disconnect the springs from the side of the wagon. When the operator then mounts the tractor and pulls away from the wagon, the springs are tensioned until they either break or their connection with the wagon side walls releases itself and they are shot forward aimed directly at the operator.

The general purpose of this invention is to provide a guide for an elevator chute which embraces all the advantages of similarly employed guides and possesses none of the afore-described disadvantages. To attain this the present invention utilizes a laterally extending rod pivotally mounted on the free end of the chute having swing straps that extend downwardly against the inner surface of the wagon side walls. In applicant's device there is no positive connection between the chute and the side walls of the wagon and thus it is not necessary to connect and disconnect the chute to the side walls. When unhitching the wagon from the tractor the chute guide will automatically release itself from the wagon side walls.

An object of the present invention is to provide a guide for the chute of an elevator that will remain centered over a trailing wagon and yet has no positive connection to the trailing wagon.

Another object is to provide a guide for an elevator chute that requires no manual connection between the chute and the trailing wagon.

These and other objects of the invention will become more apparent from the specification and drawings, wherein:

FIGURE 1 is a side view of a tractor supporting a farm implement having an elevator with an attached chute for depositing material into a trailing wagon;

FIGURE 2 is an enlarged side view of the guide means for the chute, and

FIGURE 3 is a rear view of the elevator chute guide means and interior of the wagon.

Referring now to the drawings wherein like reference characters designated like or corresponding parts throughout the several views, there is shown in FIGURE 1 a tractor generally designated 10 having a farm implement 12 mounted thereon and a wagon designated 20 having upright side and end walls 21 and 22, respectively. The wagon 20 is connected to the tractor 10 by a hitch pin 23 securing the wagon tongue 24 to the tractor drawbar 11. An elevator 31 extends upwardly and rearwardly from the implement 12 along the longitudinal axis of the tractor. The elevator 31 at its upper terminal end has a head 32 mounted thereon. The head 32 has an ear 33 extending therefrom for a purpose to be described. The head 32 has a rotary sleeve 34 pivotally mounted thereon about its discharge opening. The rotary sleeve 34 is adapted to swivel with respect to the head 32 about a substantially vertical axis designated A—A. A lever arm or mask 35 extends rearwardly from the rotary sleeve 34. A coil spring 36 is connected at one end to the ear 33 and at the other end to the lever arm 35. The spring 36 biases the lever arm 35 into a position lying along the longitudinal axis of the tractor. As the rotary sleeve and lever arm swivel about axis A—A spring 36 functions to return it to its central position.

A discharge chute 37 is pivotally mounted on the rotary sleeve 34 about a substantially horizontal axis designated B—B. Thus, as the rotary sleeve 34 swivels about the head 32 it will carry the discharge chute 37 along. As disclosed herein the discharge chute is in the form of a U-shaped trough and has a pair of lugs 38 secured along its terminal edge. A chain 39 is secured at its midpoint to the free end of lever arm 35 and is adapted to be connected at its ends to the lugs 38. The angle of the discharge chute 37 with respect to the horizontal can be adjusted by lengthening or shortening the length of chain between the lever arm 35 and the lugs 38.

The discharge chute 37 is provided at its free end with a bearing means. As disclosed herein the bearing means is formed from a first inverted U-shaped channel 40 secured to the upper terminal edges of the chute 37. A second U-shaped channel 41 is secured to the first channel 40. Apertures 42 are formed in the upwardly projecting arms of channel 41. A guide rod 50 is journalled in the aperture 42. The guide rod 50 is formed of material such as a steel rod and as disclosed herein has a bight portion 51 and leg portions 52. The leg portions 52 diverge outwardly from the bight portion such that they approximate the width of the wagon 20. The legs 52 terminate in inwardly bent portions forming stub shafts 53. Collars 54 are secured to the guide rod 50 adjacent the intersection of the legs 52 with the bight portion 51. The collars 54 function as thrust members limiting the lateral movement of the guide rod 50 in the bearing means. As can be best seen in FIGURE 3 the collars 54 are located such that some lateral movement is allowed between the guide rod 50 and the U-shaped channel 41. Additional collars 55 are secured to the stub shafts 53 and the terminal ends of the stub shafts are threaded at 56 to receive nuts 57. Swing straps 58 having apertures 59 formed therein are carried by the stub shafts 53 between the collars 54 and the nuts 57. The apertures 59 formed in the swing straps are dimensioned such that the straps are free to pivot with respect to the stub shafts. The swing straps are made of a flat sheet material having their surface parallel to the interior surface of the wagon side walls 21.

In hitching the tractor 10 to the wagon 20 the tractor is backed into alignment with the wagon. When the swing straps 58 encounter the wagon end wall 22, they pivot toward the horizontal until the end wall is passed and then fall by gravity back to a vertical position. With the tractor and wagon properly aligned the wagon hitch pin 23 is inserted to connect the tractor drawbar 11 to the wagon tongue 24. During operation when the tractor is proceeding along a straight line, the chute 37 will lie along the longitudinal axis of the tractor where it will discharge material into the center of the wagon 20. When a turn is made with the tractor there is angulation between the tractor and the wagon about the hitch pin 23. If the discharge chute were to remain along the longitudinal axis of the tractor the turn exceeds several degrees, its free end would no longer be located over the wagon and grain would be lost. However, with applicant's device when there is angulation between the tractor drawbar 11 and the wagon tongue 24, the rotary sleeve 34 and the discharge chute 37 swivel with respect to the elevator 31 such that the free end of the chute 37 remains over the center of the wagon 20. The free end of the chute 37 is maintained in its central position by the guide rod 50 which through its swing straps 58 contact the upright side walls 21 of the wagon. The guide rod 50 is constructed of material such as steel rod and thus has a certain amount of resiliency that will permit the chute to move slightly from its central position if necessary when tight turns are negotiated. Also, there is a loose fit between the guide rod 50 and its bearing means that will permit the guide rod to move laterally of the chute 37 and in addition the swing straps 58 are carried on the stub shafts 53 in a manner that will permit some lateral movement of the swing straps on the stub shafts.

Various modifications are contemplated and may obviously be resorted to by those skilled in the art without departing from the spirit and scope of the invention as hereinafter defined by the appended claims as only a preferred embodiment hereof has been disclosed.

What is claimed is:

1. A field traversing farm implement having a trailing wagon hitched thereto,
    said trailing wagon having upright side and end walls defining a box,
    a material elevator extending upwardly from and along the longitudinal axis of said implement and terminating in a discharge end above said trailing wagon,
    a downwardly directed discharge chute carried by said elevator such that it receives material from said discharge end and can swing with respect thereto about a substantially vertical axis, said downwardly directed discharge chute terminating in a free end adapted to overlie said trailing wagon within the confines of said side and end walls, means carried by said free end forming a substantially horizontal bearing.
    a guide rod including a bight portion and a pair of legs, said bight portion journalled in said bearing and said legs terminating adjacent the upper edges of said upright side walls, swing straps carried by the terminal ends of said legs and adapted to extend downwardly along the inner surfaces of said upright side walls.

2. The invention as set forth in claim 1 wherein said swing straps are of sheet material and are pivotally carried by the terminal ends of said legs with their flat surfaces adjacent the inner surfaces of said upright side walls.

3. The invention as set forth in claim 1 wherein said bight portion has collars formed thereon to limit the lateral movement of said guide rod in said bearing.

4. The invention as set forth in claim 1 wherein said guide rod is constructed of resilient rod material.

5. The invention as set forth in claim 4 wherein said downwardly directed discharge chute is spring-biased toward a position along the longitudinal axis of said material elevator as it swings about said substantially vertical axis.

6. The invention as set forth in claim 4 wherein said swing straps are of sheet material and are pivotally carried by the terminal ends of said legs with their flat surfaces adjacent the inner surfaces of said upright side walls.

7. The invention as set forth in claim 4 wherein said bight portion has collars formed thereon to limit the lateral movement of said guide rod in said bearing.

8. The inventiotn as set forth in claim 1 wherein said downwardly directed discharge chute is spring-biased toward a position along the longitudinal axis of said material elevator as it swings about said substantially vertical axis.

9. The invention as set forth in claim 8 wherein said swing straps are of sheet material and are pivotally carried by the terminal ends of said legs with their flat surfaces adjacent the inner surfaces of said upright side walls.

10. The invention as set forth in claim 8 wherein said bight portion has collars formed thereon to limit the lateral movement of said guide rod in said bearing.

References Cited

UNITED STATES PATENTS

| 2,634,004 | 4/1953 | Turek | 214—42 |
| 2,650,723 | 9/1953 | Sammer | 214—42 |
| 2,807,378 | 9/1957 | Currie | 214—42 |

FOREIGN PATENTS

| 149,341 | 8/1951 | Australia. |

ANDRES H. NIELSEN, *Primary Examiner.*